United States Patent [19]

Kent

[11] Patent Number: 4,915,662
[45] Date of Patent: Apr. 10, 1990

[54] MARINE FENDER AND CUSHION DEVICE

[76] Inventor: David Kent, 1431 Jameston, Springfield, Mo. 65809

[21] Appl. No.: 305,014

[22] Filed: Feb. 2, 1989

[51] Int. Cl.$^4$ ............................................. B63C 9/30
[52] U.S. Cl. .................................. 441/127; 114/219; 5/420
[58] Field of Search ............... 441/125, 126, 127, 128; 114/219, 361; 5/420, 465

[56] References Cited

U.S. PATENT DOCUMENTS

| | | | |
|---|---|---|---|
| 2,577,236 | 12/1951 | Doherty | 114/219 |
| 3,636,576 | 1/1972 | Nissen | 5/420 |
| 4,275,473 | 6/1981 | Poirier | 441/128 |
| 4,824,411 | 4/1989 | McClanahan | 441/129 |

Primary Examiner—Sherman D. Basinger
Assistant Examiner—Jesus D. Sotelo
Attorney, Agent, or Firm—Basil E. Demeur; Robert E. Knechtel; Alan B. Samlan

[57] ABSTRACT

There is disclosed an improved foldable marine fender and cushion combination device which is formed by a base formed by an enlarged rectangular pliable sheet having opposed side edges, a top edge and a bottom edge, a plurality of paired cushioning pads mounted on the base in a patterned spaced apart orientation which consists of at least a first pair of cushioning pads mounted along the opposed side edges of the base, a second pair of cushioning pads mounted on the base inwardly from the first pair of cushioning pads a distance equal to the overall width of one of the cushioning pads, a third pair of cushioning pads mounted on the base spaced inwardly from the second pair of cushioning pads and spaced a distance equivalent to the overall width of two of the cushioning pads. The cushioning pads and base are designed to fold in an internesting relationship one to the other such that the base and cushioning pads are foldable into a compact seat cushion configuration for use as either a seat cushion or for storage purposes. The cushion and seat combination of the present invention may also be utilized as a buoyancy support system when placed in the water.

9 Claims, 3 Drawing Sheets

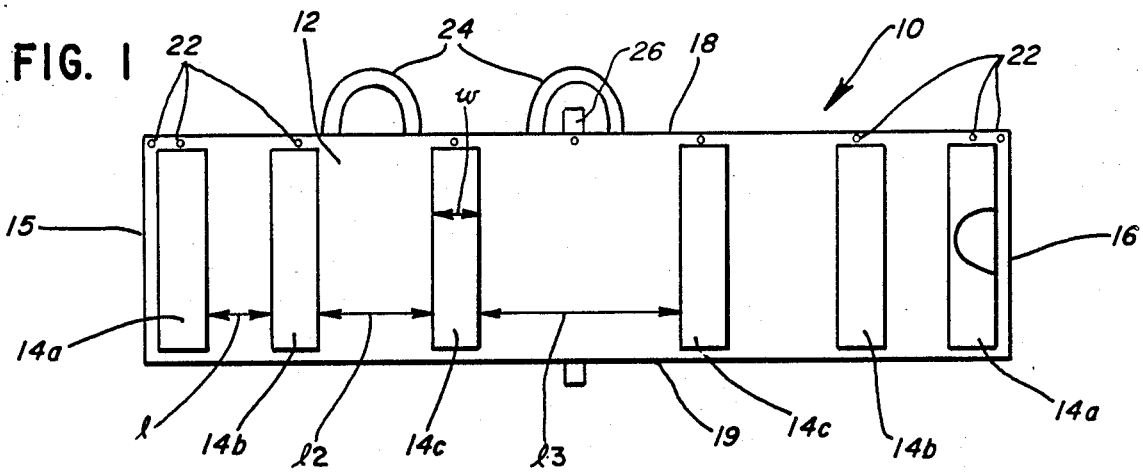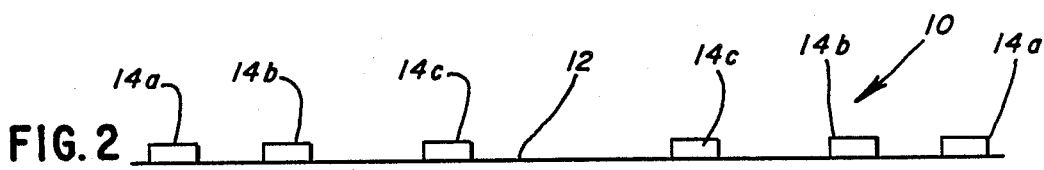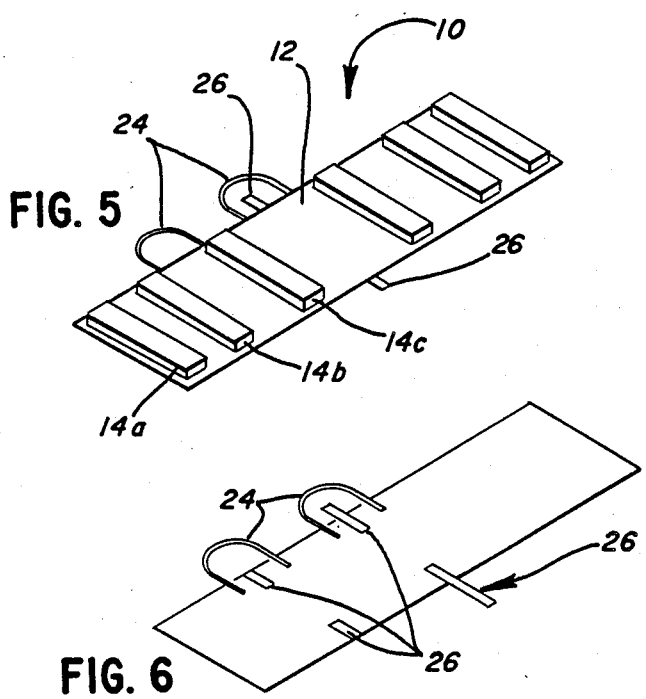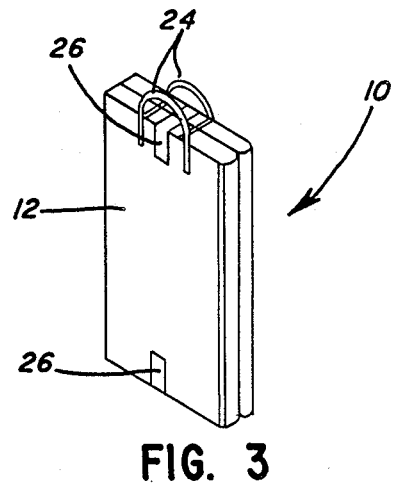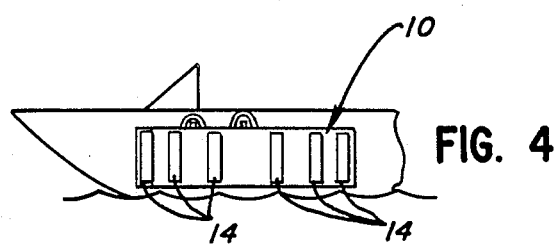

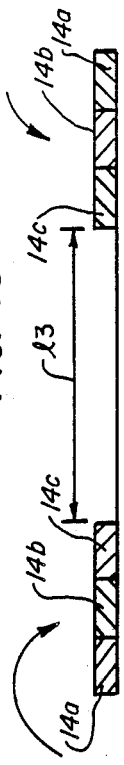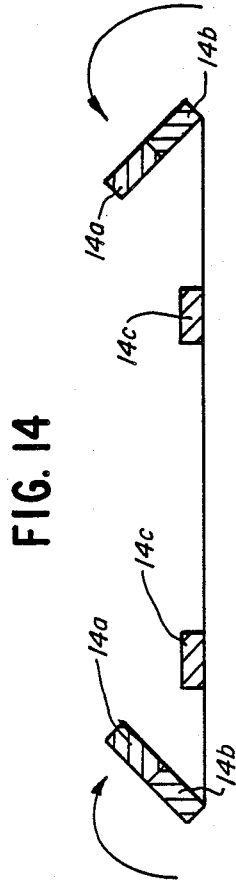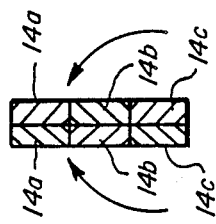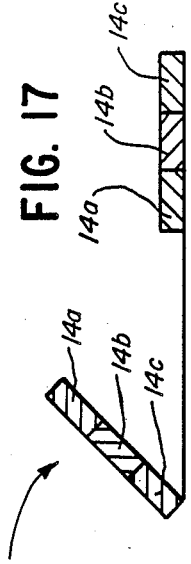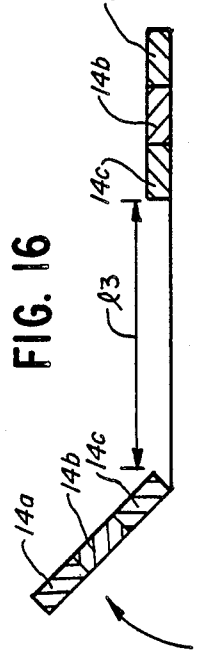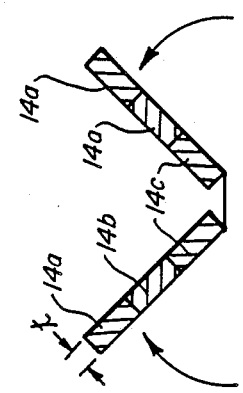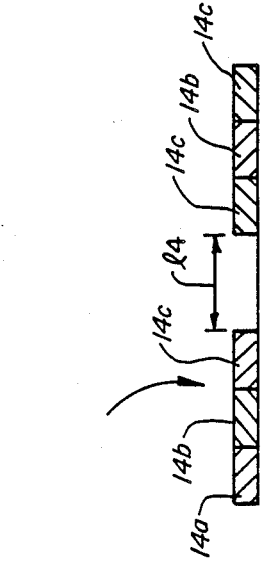

MARINE FENDER AND CUSHION DEVICE

BACKGROUND OF THE INVENTION

The present invention relates to a device primarily intended for protecting of watercraft from physical damage when coming into contact with static structure such as docks and the like, and for protecting the watercraft from damage or scraping. The device of the present invention is also intended to be foldable in such a manner that it will allow the device to serve secondarily as a seat cushion when folded, or, as a buoyancy support system when placed in the water.

Presently, the devices available for protecting watercraft from damage from other static structures such as docks and the like, generally consist of boat fenders which are cylindrical in configuration, and formed of a resillient material such as rubber, and having the interior chamber of the device air filled. Most people are well familiar with the typical boat bumper which is placed over the outside of the watercraft and intended to be positioned between the watercraft and the boat dock or other static structure. It is also well known that boat bumpers or fenders of the type described are generally bulky in size and configuration, and therefore, difficult to either handle or store. Indeed, various forms of fender or bumper racks have been developed for mounting on the sides of boats in order to accommodate the boat bumpers when not in use. Furthermore, the typical boat bumpers serve no other purpose due to their size and bulky configuration, and are therefore a single purpose boating accessory.

The prior art does disclose a variety of types of marine fenders which have been developed all for the similar purpose of protecting the watercraft from damage or scraping from other static structures or other watercraft.

Typical types of prior art boat fenders or bumpers are shown in various prior art patents. For example, U.S. Pat. No. 2,546,396 shows a combination boat fender and life raft, wherein the device when employed as a boat bumper is shown to be in a substantially cylindrical configuration, and includes a plurality of rope loops which are threaded through appropriate grommet apertures which affords the user the opportunity of either tying the fender to the watercraft, or tying a plurality of the subject boat bumpers together. It is note-worthy that the boat fender as shown in U.S. Pat. No. 2,546,396 has a single purpose application, in that it can only be employed as a boat bumper and also, will only protect one small segment or portion of the watercraft from the structure from which the watercraft is being protected, and possibly includes an area protection of perhaps between ten and twelve inches in maximum width. It is clear that the device can serve no other purpose, although the patentee clearly indicates that a plurality of these types of fenders may be tied together in order to create a raft. However, a single boat fender in and of itself has only a single purpose application, and is basically of the type which is cylindrical in configuration.

Another prior art device is shown in U.S. Pat. No. 3,026,547 which is directed to a combination boat fender and life preserver. The device as depicted therein in its typical form is shown to assume the typical cylindrical configuration of a boat fender, and is intended to be hung over the side of the watercraft for protection purposes in the manner presently typically known in the prior art. It is noted that the device includes two halves, which are normally biasingly urged together by means of a pair of springs. When used as a life preserver, the two halves are separated against the preasure of the springs, and the user would then slip the device over the head and under the arms after which the springs would normally biasingly urge the two halves together thereby to securely hold the device on the user's body. When the user has completed utilizing the device, and removes the same, the two springs biasingly urge the two halves back together thereby forming the typical cylindrically oriented boat bumper.

A more recent patent is U.S. Pat. No. 4,628,850 which shows a typical marine fender, the difference being that the device as depicted in the -850 patent has an improved construction. The boat fender as depicted therein is constructed of two halves which are intended to contain within the confines thereof a solid foam bun after which the two halves are mated and molded together. The relevance of the patent is to the affect that it again demonstrates the typical prior art marine fender which assumes a cylindrical configuration and has a single purpose usage or application, that being strictly as a marine bumper or fender.

The prior art has attempted to make other various types of marine fenders, as depicted in U.S. Pat. No. 2,577,236. The marine fender depicted therein assumes a basically flat configuration, except that the resillient pads are basically cylindrical in shape, and solid in form, and arranged parallel one to the next. Each is covered under a sheeting of heaving canvas or some other strong pliable faberic thereby to function as a marine fender. As indicated in the patent, the subject fender may be rolled into a cylindrical configuration as depicted in FIG. 4 of the patents, and tied in position such that it may be used as a typical cylindrical marine bumper. It is apparent from a review of the device as depicted in the subject patent, that the marine fender disclosed therein still assumes only a single purpose usage since whether it is employed in its flat configuration as per FIG. 1 of the drawings, or in its rolled configuration as depicted in FIG. 4 of the drawings, the subject device still can only be utilized as a boat fender or bumper. Another problem to be noted is the fact that the cushioning members are cylindrical in shape, and as such, do not lend themselves to any easy folding pattern. Indeed, the patentee fails to indicate that the device may be folded in any respect, and only indicates that the device may be rolled into a cylindrical configuration as shown in FIG. 4 of the drawings.

Other attempts of providing flat type cushioned devices are depicted in U.S. Pat. No. 4,275,473. The device as depicted therein is directed to a mattress which is suitable for use as a floating device in water. The device is constructed from a plurality of lightweight relatively rigid and buoyant blocks of substantial equal length which are positioned in parallel side by side orientation. The blocks are formed from a cellular polystyrene material, thereby to be buoyant in water. However, the device as depicted therein may only be folded into a rolled configuration, and therefore it does not permit its use as an alternate type device nor does it lend itself to easy storage.

The present invention is intended to overcome the disadvantages noted with respect to the prior art devices, and to provide a boat bumper or fender device which has alternate uses due to the nature in which the subject device is constructed.

OBJECTS AND ADVANTAGES

It is therefore the principal object of the present invention to provide an improved foldable marine fender and a seat cushion combination wherein the device, when a functioning as a marine fender is of an enlarged configuration, but nevertheless is foldable into a compact seat cushion for alternate use and storage purposes.

In conjunction with the foregoing object, a further object of the present invention to provide an improved marine fender and seat cushion combination, wherein the device includes a base formed by an enlarged rectangular pliable sheet having opposed side edges and a top and bottom edge, a plurality of paired symmetrical cushioning pads mounted on the base in a specific patterned spaced apart orientation consisting of a first pair of cushioning pads mounted on the opposed side edges of the base, a second pair of cushioning pads mounted on the base inwardly from the first pair a distance equivalent to the overall width of one of the cushioning pads, a third pair of cushioning pads mounted on the base inwardly from the second pair of pads a distance equivalent to the overall width or two of the cushioning pads, the cushioning pads being foldable into an internesting relationship one to the other such that the base and cushioning pads are foldable into a compact seat cushion configuration for alternate use and/or storage purposes.

In conjunction with the foregoing object, it is a further object of the present invention to provide an improved marine fender wherein the cushioning pads are rectangular in configuration and extend from the top edge to the bottom edge of the base.

Still a further object of the present invention is to provide an improved marine fender of the type described wherein the base further includes fastening means mounted thereon and arranged to fasten the device when in the folded configuration.

Still a further object of the present invention is to provide an improved marine fender device of the type described wherein the base is further provided with a carrying means consisting of handles mounted on the top edge thereof in order to accommodate the carrying of the device, and to further facilitate the use of the device as a buoyancy device.

Further features of the invention pertain to the particular arrangement of the parts and elements whereby the above outlined features, as well as additional operating features thereof are attained. The invention both as to its method of organization and mode of use will be better understood by reference to the following drawings as described by the specification.

SUMMARY OF THE INVENTION

In summary, the invention herein relates to an improved marine fender, which further functions as a compact seat cushion, or in the alternative, may be used as a buoyancy device in water. When utilized as a marine fender, the device of the present invention is intended to present an enlarged marine fender thereby to serve as protection for a significant portion of the watercraft from any static object against which the watercraft may be moored. Due to the novel method by which the present device is constructed, the marine fender may be easily folded into a very compact seat cushion to be used either as a seat cushion, or for storage purposes. It will also be observed that in the folded configuration, the seat cushion, due to the material out of which the device is constructed, may function as a buoyancy device to function in the manner of a life preserver.

It will therefore be observed that the device of the present invention incorporates multiple uses depending upon its open or folded configuration.

BRIEF DESCRIPTION OF DRAWINGS

FIG. 1 is a front elevational view showing the marine fender in its open configuration and intended as a marine fender;

FIG. 2 is a side edge elevational view showing the positioning of the cushioning pads relative to the base;

FIG. 3 is a perspective view showing the device in its folded, seat cushion configuration;

FIG. 4 is a front elevational view showing the device of the present invention in its unfolded configuration utilized as a marine fender on an appropriate watercraft;

FIG. 5 is a perspective view showing the marine fender in its unfolded configuration illustrating the positioning of the cushioning pads on the base of the fender;

FIG. 6 is a perspective view showing the device in its unfolded configuration as viewed from the backside thereof;

FIG. 14 is the next serial view of the folding process showing the outer pads falling into position next to the inner most pair of cushioning pads;

FIG. 15 shows the outer pads now in their folded configuration internesting with the inner most pair of cushioning pads;

FIG. 16 shows the next serial step of the folding process with the pads from one end, in this view the left sided pad being folded toward the right-hand side of the cushioning pads;

FIG. 17 shows the folding pads of the left side falling into position on the base in opposed relation to the right-hand cushioning pads;

FIG. 18 shows the pads from the left side completely folded against the base, and in a slightly spaced apart relationship with respect to the opposed pads on the right-hand side of the device;

FIG. 19 shows the left and right pads being respectively folded toward one another as the next serial step of the folding process;

FIG. 20 shows the respective pads in their fully folded position with the pads in a face to face relationsip thereby to assume the position generally illustrated in the perspective view in FIG. 3.

DETAIL DESCRIPTION OF DRAWINGS

Figure 7:
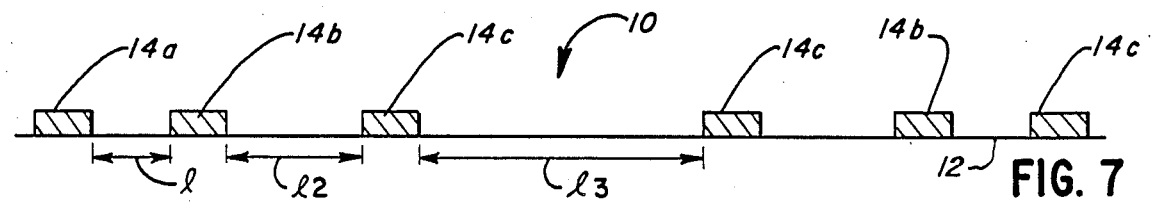
FIG. 7 is a side elevational view showing the device in its unfolded configuration preliminary to the folding procedures.
Figure 8:
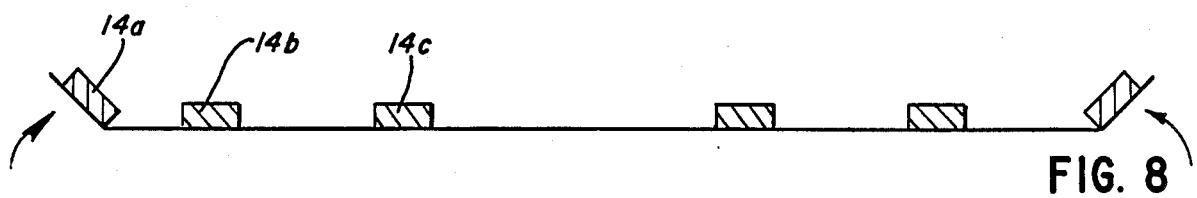
FIG. 8 is a side elevational view showing the first step of the folding process with the outer most cushioning pads being folded inwardly.
Figure 9:
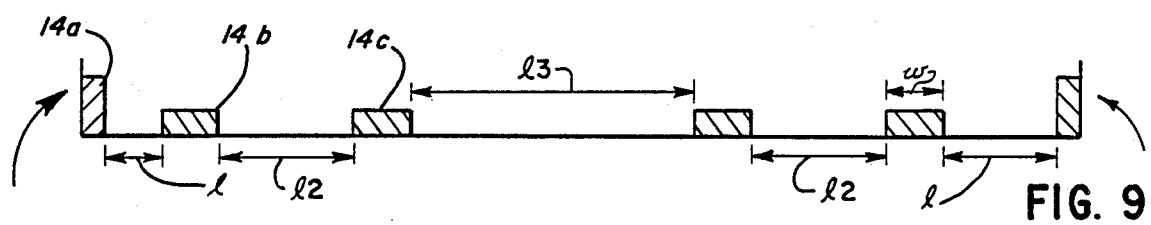
FIG. 9 is a serial view showing the first fold in process with the outer pads being folded inwardly.
Figure 10:
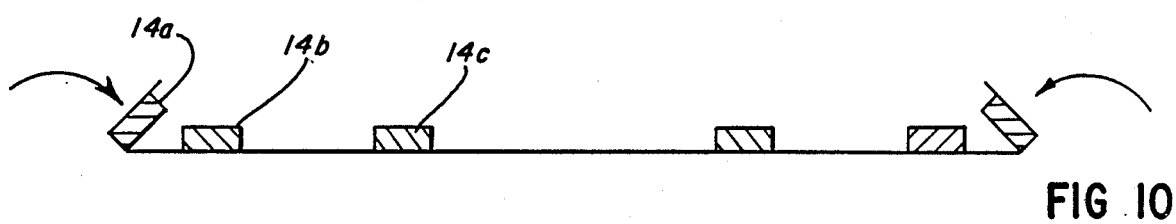
FIG. 10 is the next serial view showing the outer cushioning pad falling into position in the first fold of the folding process.

As generally illustrated in FIGS. 1 through 6 of the drawings, the improved marine fender and seat cushion device of the present invention is generally illustrated in its two most prevelant uses. With specific reference to FIG. 1 of tee drawings, the marine fender device of the present invention is generally illustrated by the numeral 10. The fender 10 is shown to be formed by a base 12 which consists of a generally rectangular sheet formed of a pliable material, which material is water repellent, and otherwise sufficiently pliable or flexible to be foldable in a manner to be described more fully hereinafter.

Mounted on the base are a plurality of cushioning pads 14, which in the preferred embodiment, actually consist of three pairs of such cushioning pads. It will be noted that the base 12 is bounded by opposed side edges 15 and 16 respectively, a top edge 18, and a bottom edge 19. The first pair of cushioning pads denoted by the numeral/letter designation, 14a, are shown to be the pads mounted adjacent the respective side edges 15 and 16 respectively of the base 12. The second pair of cushioning pads are denoted by the numeral/letter designation 14b, and it will be observed that the second pair of cushioning pads 14b are mounted on the base 12 a distance spaced inwardly from the first pair of cushioning pads 14a respectively. Indeed, the distance L between the first and second pair of cushioning pads 14a and 14b respectively, is substantially the same as the overall width W of one of the cushioning pads 14.

It will be observed that the third pair of cushioning pads 14c are mounted on the base 12 and spaced a distance inwardly from the second pair of cushioning pads 14b, a specified distance 1-2. The distance 1-2 represents a length equivalent to two widths of a cushioning pad 14, which serves a purpose to be more fully described hereinafter. The third pair of cushioning pads 14c are spaced apart one from the other a distance denoted by the numeral 1-3, which is a distance somewhat greater than three widths of a cushioning pad 14.

The distances 1, 1-2, and 1-3 are predetermined such that the entire marine fender device 10 may be folded in a manner to be more fully described hereinafter. Indeed, the distance between the third pair of cushioning pads 14c denoted by the designation 1-3 is actually a distance equal to three widths of a cushioning pad 14, plus a distance equivalent to double the thickness of a cushioning pad 14.

It will further be noted that the base 12 is provided with a plurality of reinforced apertures 22 carried along the top edge 18 of the base 12, and function for the purpose of permitting the securement of tie lines between the marine fender 10, and an appropriate watercraft. It will also be observed that the base 12 is provided with a pair of loop handles 24 which, as shown in FIG. 3 of the drawings, provide a convenient carrying handles for the device when in its folded configuration. In addition, if the device were to be used as a buoyancy support such as a life preserver, the handles 24 would aid the user of the device in grasping the same in a life preserving environment.

Finally, the base 12 is also provided with fastening means 26 mounted on the backside of the base 12 generally shown in FIG. 6 of the drawings. It will be noted that the fastening means are mounted both along the top edge 18 of the base 12 as well as the bottom edge 19 of the base 12, and in the preferred embodiment, it is cotemplated that the fastening means 26 would consist of a corresponding male and female members, the male member being a pluraility of plasticized hooks, and the female member as being a plurality of plasticized loops such that pressing the male and female members together effects a fastening function.

As illustrated in FIG. 4 of the drawings, when the marine fender device 10 of the present invention is in its fully unfolded position and secured to a watercraft such as by means of ropes interconnecting the reinforced apertures 22 formed along the top edge 18 of the base to the watercraft, a fairly enlarged area of the watercraft will be protected by the marine fender device of the present invention. This creates a significant improvement over presently existing marine fenders which are of the cylindrical configuration in that the cylindrical boat bumpers have a tendency to ride up and down on the watercraft as well as from side to side, and if they are moved out of protective position relative to the watercraft, the watercraft will scrape against the object to which it is moored. To the contrary, the marine fender device 10 of the present invention when mounted on the watercraft, will have a tendency to stay in place for the reason that the backside of the base 12 is flush or flat with respect to the watercraft hull. Hence, there is a greater frictional surface presented as between the back of the base 12 and the watercraft hull, such that the marine fender 10 has a tendency not to ride either up or down relative to the watercraft, nor will it ride from side to side. Hence, a greater degree of protection will be afforded to the watercraft by the marine fender device 10 of the present invention.

It will also be appreciated that, as with other marine fenders or bumpers, the marine fender device 10 of the present invention may be placed in pairs or in stack multiples in order to further increase the area of protection afforded to water vessels. This is especially useful if the marine fender device 10 of the present invention is utilized on a fixed dock to protect incoming watercraft. Hence, by using several marine fender devices 10 of the present invention, a significant area of protection can be provided such that several watercraft may be docked against the same dock without, at the same time, requiring numerous boat bumpers or fenders of the cylindrical type which would require numerous of such types of bumpers.

Figure 11:
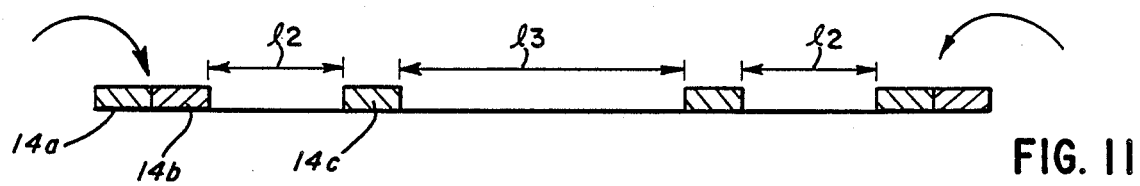
FIG. 11 shows the outer cushioning pads as folded, and positioned in an internesting relationship with the second pair of cushioning pads.
Figure 12:
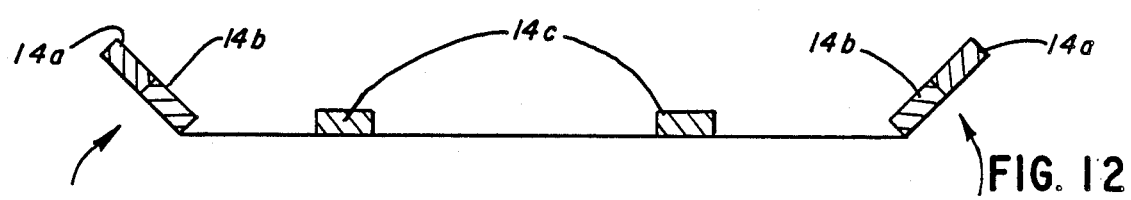
FIG. 12 shows the next serial step of the folding process wherein the outer pads are now folded inwardly toward the inner most pair of cushioning pads.
Figure 13:
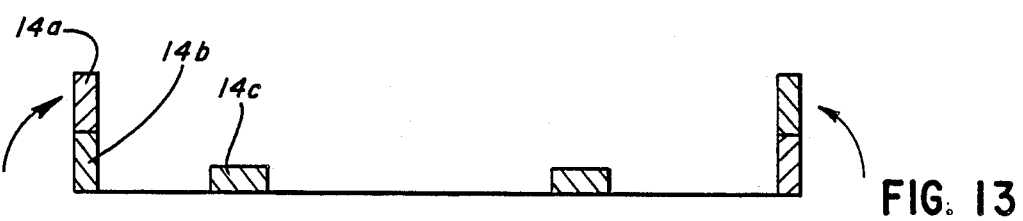
FIG. 13 shows the next serial view of the outer pads being folded toward the inwardly positioned pads.

Another advantage to the marine fender device 10 of the present invention is that it is easily foldable into a compact configuration. FIGS. 7 through 20 of the drawings illustrate the folding pattern in serial sequence in order to illustrate the manner in which the device is foldable into a compact seat cushion. FIGS. 7 through 11 illustrate the first fold sequence wherein the outer pair of cushioning pads 14a are folded toward the second pair of cushioning pads 14b. As indicated previously, the distance between the outer first pair of cushioning pads 14a and the second inwardly mounted cushioning pads 14b represents a distance 1 which is the equivalent of one full width of a cushioning pad 14. It will be observed that as the outer first pair of cushioning pads 14a are folded inwardly by folding the opposed side edges of the base 12 inwardly, as shown in FIG. 11 of the drawings, the outer cushioning pad 14a will internest directly next to the second respective cushioning pad 14b.

As shown in FIGS. 11 through 15 of the drawings, the next sequential fold of the marine fender device 10 is illustrated. It will also be observed that the third pair of cushioning pads 14c are mounted on the base 12 a distance 1-2 spaced inwardly from the second pair of cushioning pads 14b, the distance 1-2 representing substantially two full widths w of a typical cushioning pad 14. It will be observed that the second fold is accomplished by folding cushioning pads 14a and 14b together, respectively, inwardly toward the third pair of cushioning pads 14c such as sequentially shown in FIGS. 12 through 15 of the drawings. When the fold is completed, the device will assume the configuration as shown in FIG. 15, wherein each member of the three pair of cushioning pads, namely 14a, 14b, and 14c respectively are linear allignment, and spaced apart from the opposed ones of the pairs 14a, 14b, and 14c, a distance 1-3. The distance 1-3 is a distance equivalent to at least three widths w of a cushioning pad, and in addition, a distance equivalent to two thicknesses of the cushioning pad 14.

The third and final fold sequence in order to affect the complete fold of the marine fender device 10 into a seat cushion is illustrated in FIGS. 16 through 20 of the drawings. This fold sequence is accomplished by folding one of the side edges of the base 12 which now includes three members of the pair of cushioning pads 14a, 14b, and 14c respectively over onto the base. FIGS. 16, 17, and 18 illustrate this particular fold pattern, with FIG. 18 illustrating the configuration of the device when the fold is completed. In this position, the respective members of the pairs of cushioning pads 14a, 14b, and 14c respectively are stilled spaced apart a distance 1-4. The distance 1-4 is indicated,is equivalent to the thickness of two cushioning pads 14 for the reason that it must satisfy the space dimensions to accomplish the fourth fold generally illustrated in FIGS. 19 and 20 of the drawings. The thickness dimension of a cushioning pad as illustrated by the designation t (FIG. 19 of the drawings). Hence, it will be appreciated that the final fold illustrated in FIGS. 19 and 20 of the drawings, is simply the movement of the two ends of the base 12 having the respective members of the pairs of cushioning pads 14a, 14b, and 14c respectively toward one another such that the final configuration of the device as folded is shown in FIG. 20 of the drawings. This represents the configuration as also illustrated in FIG. 3 of the drawings.

Once the marine fender 10 has been folded as illustrated, a compact seat cushion configuration as illustrated in FIG. 3 of the drawings is achieved. In this position, the fastening means 26 which are now located both along the top edge 18 and bottom edge 19 of the base 12 may be secured thereby securely holding the two sides together, and positioning the loop handles 12 in position for transporting the device 10.

Another further use of the marine fender device 10 of the present invention would be to utilize the device in its folded configuration as a boat bumper by utilizing the handles as the fastening means for fastening the marine fender device 10 to the watercraft. It is contemplated that in this useage, one would have a double layer of cushioning pads 14 as the protection means against the fixed dock or other mooring station, thereby to provide the watercraft with even a greater degree of protection. It is contemplated that this useage would occur only under extreme conditions where the watercraft is exposed to a greater degree of rocking or movement due to extreme weather conditions.

It will further be appreciated that as contemplated by the present invention, each of the cushioning pads 14 assumes a rectangular configuration, and is fixedly secured to the base 12 incident to the manufacturing process. The cushioning pads 14 are intended to be formed of a shock absorbing material which is of a closed-cell, high density polypropylene foam which is greatly impervious to the effects of water even after prolonged periods of submersion in either fresh or salt water. The base 12 is contemplated to be formed of a vinyl type material which is mildew resistant and also impervious to the effects of either fresh or salt water. It is contemplated that during the manufacturing process, the cushioning pads would be enveloped within the vinyl material of which the base is formed, such that the entire marine fender device 10 assumes a substantially unitary construction. Furthermore, the materials as identified are buoyant materials, and as such, when the marine fender device 10 assumes its folded configuration, it is contemplated that the device could serve as a life preserver or other buoyancy support system for the protection of the boaters. In this connection, the loop handles 24 may be made sufficiently large so that when used as a life preserver, the boater may insert not only their hands but also forearms through the handles 24 and thus to securely hold on to the marine fender device 10 for a period sufficient to await a rescue operation.

The fastening means, as previously indicated, may be easily fashioned from the typical type of fastening means generally sold under the trademark "velcro", which consists of male/female members, the male member consisting of a plurality of hooks and the female member consisting of a mass of hoops such that when pressed together, the male hooks intertwine and hook onto the female hook members. By placing the fastening means on both the top and bottom of the device, when in its folded configuration, the device will be securely fastened together along both the top and bottom edges thereof, all as shown in FIG. 3 of the drawings.

As indicated previously, one of the advantages achieved by the marine fender device 10 of the present invention is that when utilized in its unfolded configuration as a marine fender, a flat surface is presented for orientation against the hull of the watercraft. This is contradistinguished from the typical cylindrical boat bumpers presently in use, which have a tendendcy to ride up the hull during extreme weather conditions and hence, may ride up and out of a protective position thereby exposing the watercraft damage. The marine fender device 10 of the present invention by presenting a flat surface to the watercraft, resists the tendendy of the marine fender device 10 from riding up the watercraft during extreme conditions, and thereby affords the craft a higher level of protection, since the frictional force operating as between the flats back surface of the base 12 and the watercraft hull tend to maintain the relative position of the fender in place against the hull of the watercraft. Hence, the marine fender device 10 the present invention is found to be very stable under adverse weather conditions.

While there is described what is at present considered to be the preferred embodiment of the invention, it will be understood that various modifications may be made therein, and it is intended to cover it in the appended claims all such modifications as fall within the true spirit and scope of the invention.

What is claimed is:

1. An improved foldable marine fender device and cushion combination, comprising in combination, a base formed by an enlarged rectangular pliable sheet having opposed side edges and a top and bottom edge, a plurality of paired symmetrical cushioning pads mounted on said base in a patterned spaced apart orientation consisting of at least, a first pair of cushioning pads mounted along the opposed side edges of said base, a second pair of cushioning pads mounted on said base inwardly from said first pair of cushioning pads a distance equivalent to the overall width of one of said cushioning pads, at least a third pair of cushioning pads mounted on said base inwardly from said second pair of cushioning pads a distance equivalent to the overall width of two of said cushioning pads, said cushioning pads being foldable in an internesting relationship one to the other such that said base and cushioning pads are foldable into a compact seat cushion configuration for use as a seat cushion and for storage purposes.

2. The improved fender and cushion device as set forth in claim 1 above, wherein said cushioning pads are each rectangular in configuration.

3. The improved fender and cushion device as set forth in claim 2 above, wherein said cushioning pads extend from the top edge of said base to the bottom edge thereof.

4. The improved fender and cushion device as set forth in claim 1 above, wherein said base further includes fastening means mounted thereon and arranged to fasten said device when in the folded configuration.

5. The improved fender and cushion device as set forth in claim 4 above, wherein said base further includes carrying means mounted on the top edge thereof to accommodate the carrying of said device, especially when in the folded configuration.

6. The improved fender and cushion device as set forth in claim 5 above, wherein said carrying means comprises a pair of loop handles mounted along the top edge of said base and extending upwardly therefrom whereby said fender and cushion device may be easily transported when in the folded configuration.

7. The improved fender and cushion device as set forth in claim 4 above, wherein said fastening means comprises two pair of corresponding male and female fastening members secured along the top and bottom edges of said base respectively, and arranged such that when said base and cushioning pads are in the compactly folded configuration, said male and female fastening members may be matingly engaged.

8. The improved fender and cushion device as set forth in claim 1 above, wherein said fender and cushion device further includes a plurality of mounting means positioned along the top edge of said base to accommodate the mounting of said fender to an object requiring protection.

9. The improved fender and cushion device as set forth in claim 8 above, wherein said mounting means comprise a plurality of reinforced apertures positioned in said base along the top edge thereof.

* * * * *